United States Patent
Thomas et al.

(10) Patent No.: US 9,026,638 B2
(45) Date of Patent: May 5, 2015

(54) STEALTH ENTROPY COLLECTION

(75) Inventors: Kasman E. Thomas, Wilton, CT (US);
Stephen R Carter, Spanish Fork, UT (US)

(73) Assignee: Novell, Inc., Provo, UT (US)

(*) Notice: Subject to any disclaimer, the term of this patent is extended or adjusted under 35 U.S.C. 154(b) by 1911 days.

(21) Appl. No.: 11/702,453

(22) Filed: Feb. 5, 2007

(65) Prior Publication Data

US 2008/0189356 A1    Aug. 7, 2008

(51) Int. Cl.
| | | |
|---|---|---|
| *G06F 15/16* | (2006.01) | |
| *H04L 29/06* | (2006.01) | |
| *H04L 12/26* | (2006.01) | |
| *G06F 7/58* | (2006.01) | |

(52) U.S. Cl.
CPC ............ *H04L 63/1458* (2013.01); *H04L 43/04* (2013.01); *G06F 7/58* (2013.01); *G06F 7/588* (2013.01)

(58) Field of Classification Search
CPC ........... G06F 11/34; G06F 11/30; G06F 7/58; H04L 43/04
USPC ........................................................ 709/224
See application file for complete search history.

(56) References Cited

U.S. PATENT DOCUMENTS

| | | | | |
|---|---|---|---|---|
| 6,628,786 | B1 * | 9/2003 | Dole .............................. | 380/44 |
| 6,687,721 | B1 * | 2/2004 | Wells et al. .................... | 708/250 |
| 6,862,605 | B2 * | 3/2005 | Wilber .......................... | 708/255 |
| 6,954,770 | B1 | 10/2005 | Carlson et al. | |
| 6,985,918 | B2 | 1/2006 | Shackleford et al. | |
| 7,007,050 | B2 * | 2/2006 | Saarinen ........................ | 708/250 |
| 7,590,674 | B2 * | 9/2009 | Miller ............................ | 708/250 |
| 2003/0154239 | A1 * | 8/2003 | Davis et al. ................... | 709/201 |
| 2005/0055399 | A1 * | 3/2005 | Savchuk ........................ | 709/203 |
| 2006/0072747 | A1 * | 4/2006 | Wood et al. ..................... | 380/44 |
| 2006/0224898 | A1 * | 10/2006 | Ahmed .......................... | 713/186 |
| 2007/0077992 | A1 * | 4/2007 | Midgley et al. ................. | 463/42 |
| 2007/0189534 | A1 * | 8/2007 | Wood et al. .................... | 380/255 |
| 2007/0192864 | A1 * | 8/2007 | Bryant et al. ................... | 726/23 |
| 2007/0226803 | A1 * | 9/2007 | Kim et al. ........................ | 726/24 |
| 2007/0230693 | A1 * | 10/2007 | Mueller et al. .................. | 380/46 |
| 2007/0271466 | A1 * | 11/2007 | Mak et al. ...................... | 713/184 |

OTHER PUBLICATIONS

Bytefusion Ltd, "SecExMailGate," 2003-2004 Bytefusion Ltd., pp. 1-53.

* cited by examiner

*Primary Examiner* — Aaron Strange
(74) *Attorney, Agent, or Firm* — King & Schickli PLLC (57) ABSTRACT

In a computing system environment, methods and apparatus include tapping a plurality of connected computing devices and distilling small amounts of entropy from each, concentrating the entropy so collected, and performing all in a stealth or surreptitious fashion relative to the providers of the entropy. In this manner: the potential supply of entropy on a networked computing device is greatly expanded; the potential for entropy-related denial-of-service attacks in Linux systems is reduced; no significant extra processing burden on participating computing devices is required; and enlisting entropy-providing computing devices (including or not naïve applications) in entropy exchanges occurs unobtrusively. Representative particular environments include web servers, including servlet filters, and clients engaged in http sessions; Java virtual machines; network interface cards in promiscuous mode analyzing packets; and other. Computer program products for devices to realize the foregoing are also intended.

8 Claims, 13 Drawing Sheets

STEALTH ENTROPY COLLECTION

FIELD OF THE INVENTION

Generally, the present invention relates to computing system environments involved in collecting entropy data, such as for generating seed values for pseudo random number generators. Particularly, it relates to a collecting entropy data unbeknownst to the entropy-providers. Various features relate to particular computing environments or computer program products. Gathering entropy in typically existing configurations is also considered as is developing synergy from multiple computing devices. The use of servlet filters, Java virtual machines and network interface cards are other noteworthy aspects.

BACKGROUND OF THE INVENTION

Entities involved in cryptography, science and research, security, military, communications and gaming industry applications, to name a few, all have present and growing needs for "entropy data," such as that used to stir, disturb or otherwise introduce unpredictability or non-determination into deterministic functions or routines such as computer-generated random numbers. As a practical matter, however, it is well known that obtaining truly random numbers for the above-mentioned and other applications is exceptionally difficult. Also, seed values for pseudo random number generators (PRNGs) must meet precise criteria in order for the PRNG to be of practical use in certain applications, especially those involved in cryptography.

To this end, it has been fairly suggested to develop dedicated computing devices for delivering or introducing entropy data beyond that which is capable of being generated by a single computing device. In U.S. Patent Publication 2006/0072747, for example, multiple "entropy servers" are contemplated and covers the scenario in which a computing device makes a request to the servers using a predetermined protocol over a connection existing solely to service that request. Also, the request is semantically understood by both parties to be, in fact, a request for entropy and the enlisting party awaits responses from the servers over the same connection as that which the request was made.

A problem with this approach, however, is that dedicated systems and protocols add economic and computing costs, which effectively limits growth and somewhat burdens resources. To the extent the choreography between devices also occurs in a predetermined fashion over a dedicated, known connection, this potentially compromises physical security or that from hacking.

In other applications, a typical way of obtaining "entropy bits" for use as seed values in PRNGs (on Linux) is to collect some combination of inter-keystroke timings, mouse-coordinate deltas, and/or inter-interrupt timing values on a local machine. An "entropy buffer," for the bits, is then persisted to disk across machine reboots and be reused on startup. However, this technique has been criticized in the Linux community, from time to time, not only on information-theoretic grounds (because seed values produced are not random at all) but also because of its vulnerability to hacking. While the rebuttal has been that the heuristics have worked "well enough" in practice, this is insufficient for certain critical applications listed above and in the future as demand for entropy bits grows across all applications.

Furthermore, the Linux entropy scheme is well-known to be a low-yield system, seldom capable of producing more than hundreds of bits per second. Accordingly, it is not unusual for a Linux machine to "starve" for entropy in periods of high demand (when numerous secure connections are being opened or numerous cryptographic applications are executing, for instance). As documented for the Exim utility in Debian: "Insufficient entropy available is a frequent cause of TLS failures in Exim context. If Exim says 'not enough random bytes available', or simply hangs silently when an encrypted connection should be established, then Exim was unable to read enough random data from /dev/random to do whatever cryptographic operation is requested." (http://pkg-exim4.alioth.debian.org/README/README.Debian.html#id2452196). The mere fact that you can starve a Linux machine for entropy in this straightforward way, of course, constitutes a vulnerability.

Accordingly, a need exists in the art of entropy collection for minimizing both economic and computing costs and reducing or eliminating threats or vulnerabilities relating to physical and hacking security. Such should also contemplate a sound information-theoretic basis, enable high yields or payloads, regardless of when needed, be of sufficient quality for all types of application, and be extendable to grow as needed per application. Naturally, any improvements should further contemplate good engineering practices, such as relative inexpensiveness, stability, ease of implementation, low complexity, unobtrusiveness, etc.

SUMMARY OF THE INVENTION

The above-mentioned and other problems become solved by applying the principles and teachings associated with the hereinafter-described stealth entropy collection. Techniques and computing arrangements for the surreptitious collection of entropy data, especially bits for seed values for PRNG's, are described. In a basic sense, an entropy-consumer (or supplier to other consumers) collects or gathers entropy data from one or more entropy-providers and does so unbeknownst to the providers (or third party eavesdroppers) and their attendant computing applications. The consumer also collects the data in typical computing system environments arranged originally for other than entropy collection. In this manner, economic and computing costs are downplayed while physical and hacking security is enhanced. That is, existing computing environments do not require physical reconfiguration and, if parties do not know they are being used as an entropy source, or how the entropy is gathered, security breaches from the providers and eavesdroppers are made complicated. The amount of entropy available to the consumer is also enhanced by engaging multiple entropy-providers or multiple exchanges, described below, per each provider.

In one aspect, requests and responses are exchanged between an entropy-consumer and one or more entropy-providers. The consumer examines the requests of the provider for necessary responses that would normally yield unpredictability, such as that from a request for user-driven values like mouse-event data, inter-keystroke timing data, inter-interrupting timing values, event timestamp data, etc. Along with providing a typical response back to the provider, the consumer siphons or extracts the unpredictable values. The consumer then buffers the values and uses or outsources same for entropy purposes, such as seed values for PRNGs.

In another aspect, a web server is the entropy-consumer and one or more web clients are the entropy-providers. The server and clients are also engaged in an http session. The server is running or executing Tomcat and is facilitating interactive web applications of the clients, known colloquially as AJAX applications. In turn, a front-end servlet filter of Tomcat examines the requests of the AJAX applications, especially header information, for the afore-mentioned user driven values having unpredictability. While returning the responses to the applications, the filter also siphons the values and supplies them to an entropy buffer for immediate or later use.

In a Java virtual machine, having integral services and at least one internal application, the surreptitious gathering of entropy data contemplates logic to exploit applications exchanging requests and responses from the integral services relative to unpredictable values, such as inquiries relating to user screen sizes, a present time, etc.

In a network interface card (NIC) (collectively representing NICs or similar items known by different names in different networks, such as an Ethernet interface card in an Ethernet network, or a token ring interface card in a token ring network, etc.), the NIC is placed in a promiscuous mode to receive and analyze any and all packets coming to it. In turn, and unbeknownst to the packet or a sender of the packet, the packet is analyzed for unpredictable information or entropy data. At present, a packet length, an amount of time between receipt of packets, a rate of collisions of packets, or the like, is contemplated for gathering entropy data. Naturally, skilled artisans will be able to contemplate others, especially considering the near endless variety of unpredictable information that could be gathered from the packets, individually or as a whole.

In still other aspects, entropy synergy is developed by way of harnessing a single computing device's call to an entropy-based function, such as math.random. Grids of computing devices exchanged in the collection entropy also add to the overall synergy of the system and are also harnessed.

Regardless of form, the foregoing enables: great expansion of the potential supply of entropy on a networked computing device; reducing the potential for entropy-related denial-of-service attacks in Linux systems; avoidance of significant extra processing burdens on participating computing devices; and unobtrusive enlistment of entropy-providing computing devices (including or not naïve applications) in entropy exchanges.

Still other embodiments contemplate computer program products, with executable instructions, available as a download or on a computer-readable media, for implementing some or all of the foregoing on one or more computing devices.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for the stealth collection of entropy are hereinafter described.

Preliminarily, however, "entropy," "entropy data" or "entropy bits" are terms interchanged herein and are distinguishable from random number values. For purposes of this invention, the distinction hinges on usage. For example, the overriding requirement for entropy data destined for use in PRNG seed values is that the entropy data be of a kind that is unpredictable or uncertain. While it is certainly highly desirable, also, for such to be uncorrelated and "random," the latter two are not requirements. In the real world, data that meets this unpredictable description might, for example, be derived from observation of radioactive decay, such as from observing the time interval between two successive emissions from a beta emitter, e.g., phosphorous 32.

Figure 1:
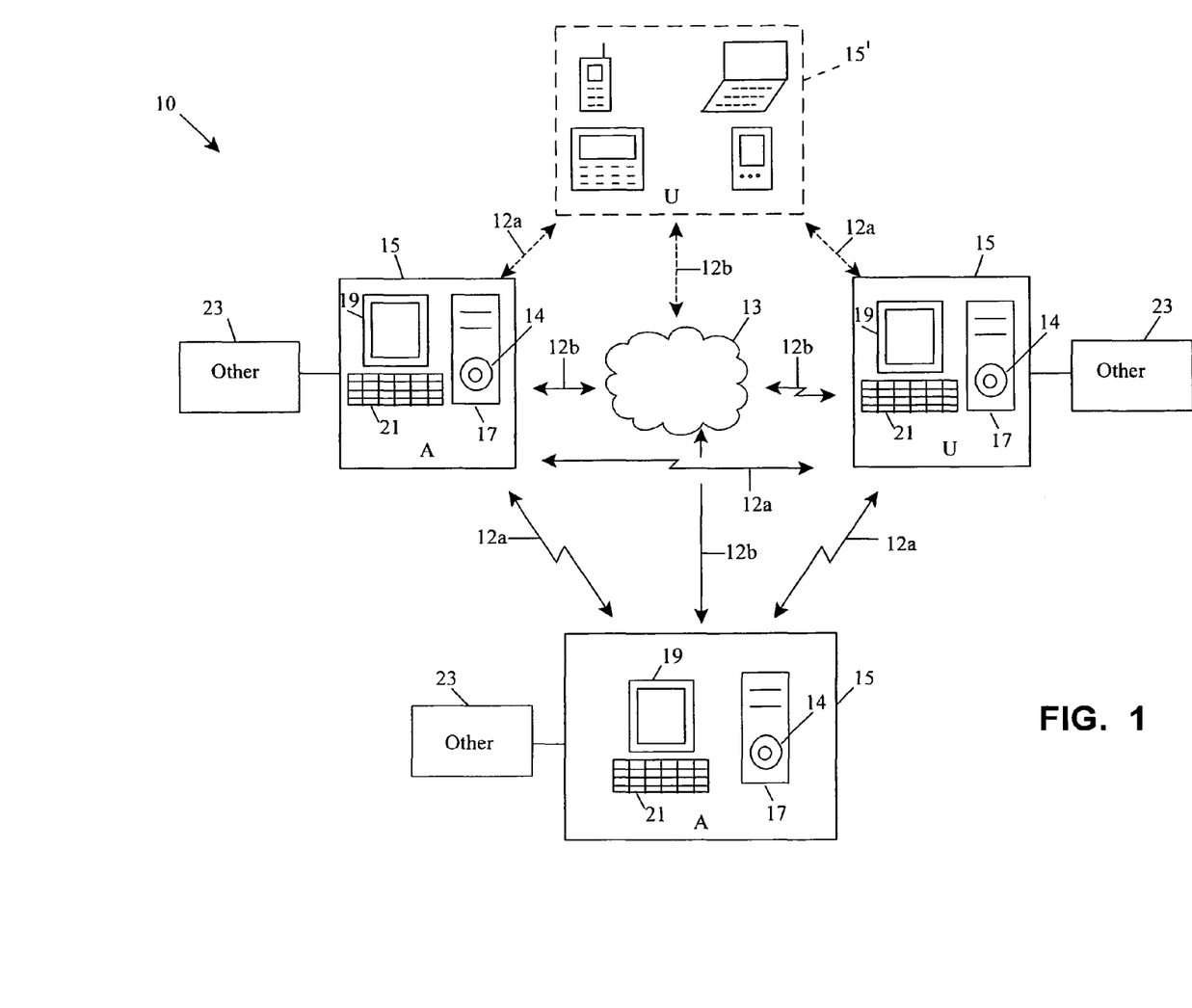
FIG. 1 is a diagrammatic view in accordance with the present invention of a representative computing system environment for stealth entropy collection.

With reference to FIG. 1, a representative environment 10 for the stealth or surreptitious collection of entropy includes one or more computing devices 15 available per each of an entropy-provider and an entropy-consumer (often the entropy gatherer). In a traditional sense, an exemplary computing device exemplifies a stand alone server 17, such as a grid or blade server. Alternatively, an exemplary computing device includes a general or special purpose computing device in the form of a conventional fixed or mobile computer 17 having an attendant monitor 19 and user interface 21. The computer internally includes a processing unit for a resident operating system, such as DOS, WINDOWS, MACINTOSH, VISTA, UNIX and LINUX, to name a few, a memory, and a bus that couples various internal and external units, e.g., other 23, to one another. Representative other items 23 (also available per each of the entropy-provider or -consumer) include, but are not limited to, PDA's, cameras, scanners, printers, microphones, joy sticks, game pads, satellite dishes, hand-held devices, consumer electronics, minicomputers, computer clusters, main frame computers, a message queue, a peer machine, a broadcast antenna, a web server, an AJAX client, a grid-computing node, a peer, a virtual machine, a web service endpoint, an audio or video port from which noise can be sampled, a cellular phone or palm device, or the like. The other items may also be stand alone computing devices 15' in the environment 10.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of entropy bits or computer executable instructions, e.g., software, as part of computer program products on readable media, e.g., disk 14 for insertion in a drive of computer 17. Computer executable instructions may also be available as a download or reside in hardware, firmware or combinations in any or all of the depicted devices 15 or 15'.

When described in the context of computer program products, it is denoted that items thereof, such as modules, routines, programs, objects, components, data structures, etc., perform particular tasks or implement particular abstract data types within various structures of the computing system which cause a certain function or group of functions. In form, the computer product can be any available media, such as RAM, ROM, EEPROM, CD-ROM, DVD, or other optical disk storage devices, magnetic disk storage devices, floppy disks, or any other medium which can be used to store the items thereof and which can be assessed in the environment.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation. The topology is also any of a variety, such as ring, star, bridged, cascaded, meshed, or other known or hereinafter invented arrangement.

Figure 2:
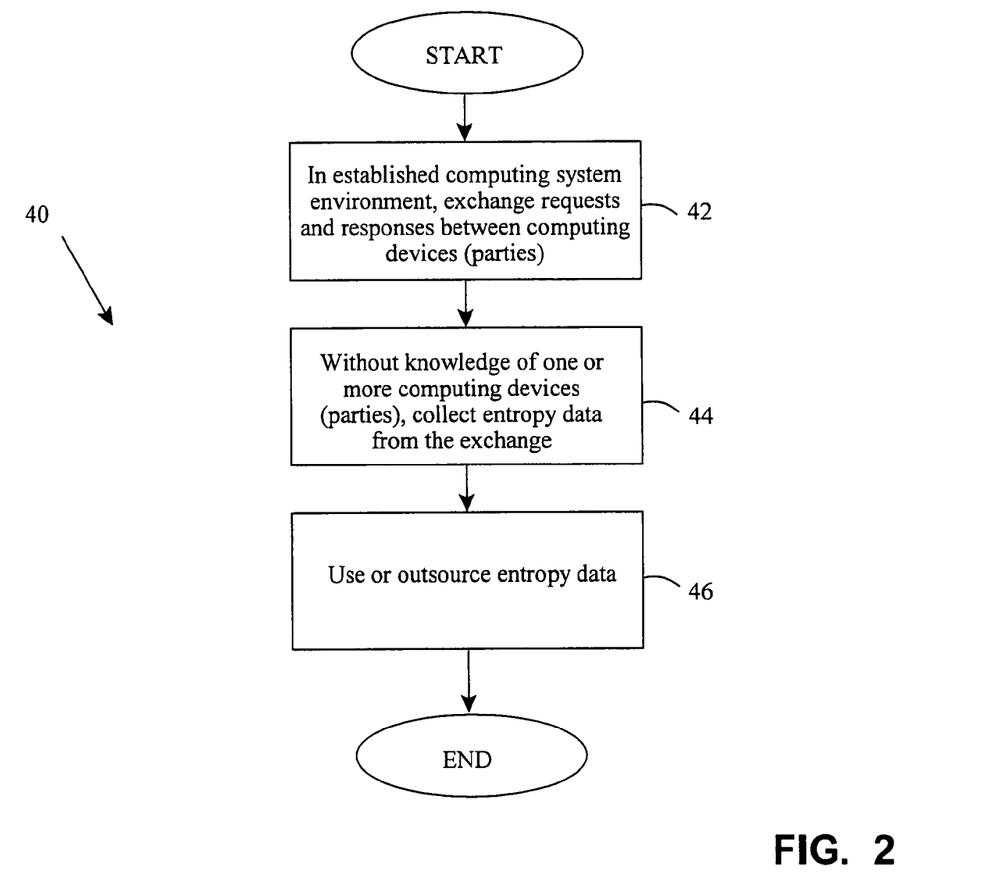
FIG. 2 is a high-level flow organization in accordance with the present invention for stealth entropy collection.

With the foregoing representative computing environment as a backdrop, FIG. 2 shows a high-level organization 40 for the stealth or surreptitious collection of entropy from an entropy-provider, by an entropy-consumer (or vendor, "outsourcer," etc. for another consumer. To this end, U.S. Pat. No. 8,606,834 entitled "Managing Supplied Data," is incorporated herein in its entirety). At step 42, an exchange of requests and responses occur between the computing devices of the entropy-provider and -consumer (parties). Also, the exchange occurs representatively in an environment established primarily or actively for other than entropy collection. In this manner, economic and computing costs are minimized while physical and hacking security is enhanced. That is, existing computing environments do not require physical reconfiguration and, if parties do not know they are being used as an entropy source, or how the entropy is gathered, security breaches from the providers and eavesdroppers are confounded. Alternatively, but to a lesser extent, the exchange of requests and responses between the parties occurs in an environment dedicated to the collection of entropy data.

At step 44, without knowledge of one or more of the computing devices, entropy data is collected or gathered from one party, by another according to the exchange of requests and responses. This also includes collecting entropy without knowledge by the attendant applications of the computing devices or direct or inferential knowledge by users of the computing devices. In other words, the party, and its users, being tagged as a source of entropy have substantially no idea of its occurrence. One such reason for this is that the gatherer of the entropy will usually also return a response to the provider of entropy, as anticipated by the provider, and so the provider will have no reason to suspect that it has been clandestinely employed in providing entropy to the gatherer. At the same time, however, the gathering or consuming party will likely siphon or extract the data as it fashions the response expected by the provider. As before, that which the gatherer is looking for is a response having unpredictable information therein. Described in more detail below, this includes user-driven values, such as mouse-event data, inter-keystroke timing data, inter-interrupting timing values, event timestamp data, and the like. It also includes other known or hereafter contemplated data also meeting the unpredictable-nature definition of entropy.

Finally, at step 46, the gathering party of the entropy then uses it immediately or later for any of a variety of purposes, or vends or outsources it to another consumer. In this regard, memory and/or buffers are contemplated to accumulate the entropy for various intended applications. Preferably, the entropy also serves as seed values for PRNGs in a variety of operations.

Figure 3A:
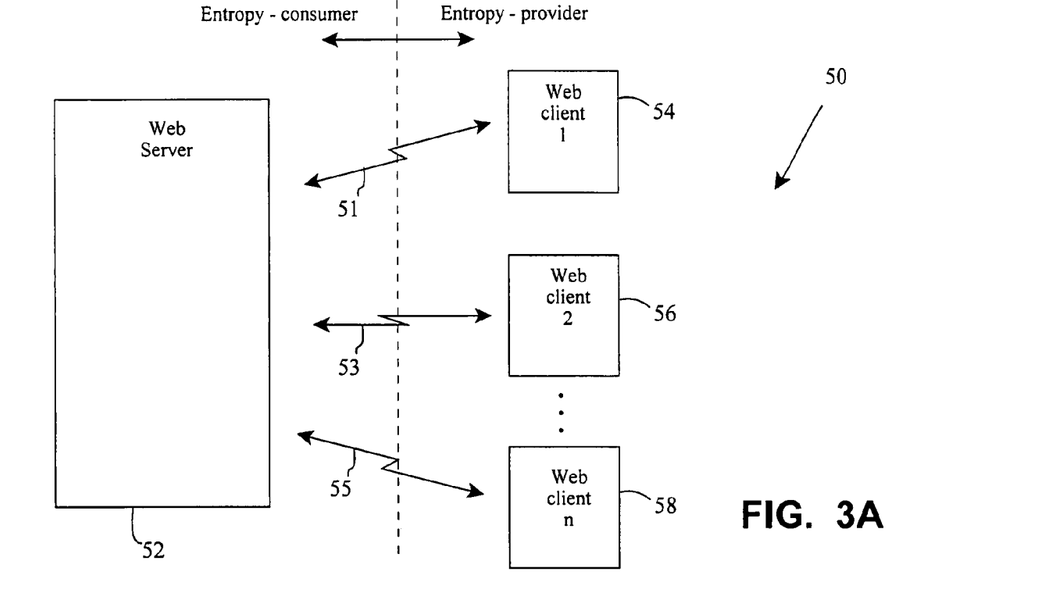
FIG. 3A is a diagrammatic view in accordance with the present invention of an alternate representative computing system environment for stealth entropy collection.
Figure 3B:
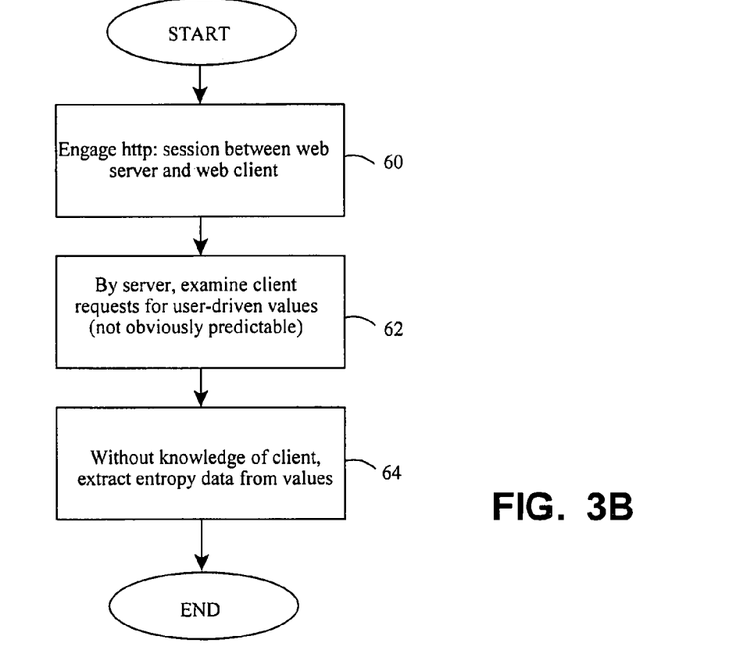
FIG. 3B is a flow chart in accordance with the present invention for stealth entropy collection according to the representation of FIG. 3A.

With reference to FIGS. 3A and 3B, a more detailed explanation is given relative to a computing environment 50 having computing devices engaged in the exchange of requests and response (indicated by the arrows 51, 52, 55) for various purposes. In one aspect, the computing devices comprise an entropy-consumer 52 (or vendor for other consumers) and multiple entropy-providers 54, 56, 58. In another, the devices comprise a web server that surreptitiously gathers entropy from multiple web clients (donors) based on the information from the exchange of requests and responses.

According to step 60, the consumer and providers are engaged in a typical transaction, such as an http session between the server and the clients 1, 2, . . . n. Upon the sever recognizing requests from the clients relating to user-driven values, not obviously predictable (step 62), the server extracts the entropy from the values and does so unbeknownst to any of the clients (step 64). As before, to avoid raising suspicions by the clients, the server also returns a normal response to the web client as is expected by the client.

Figure 4A:
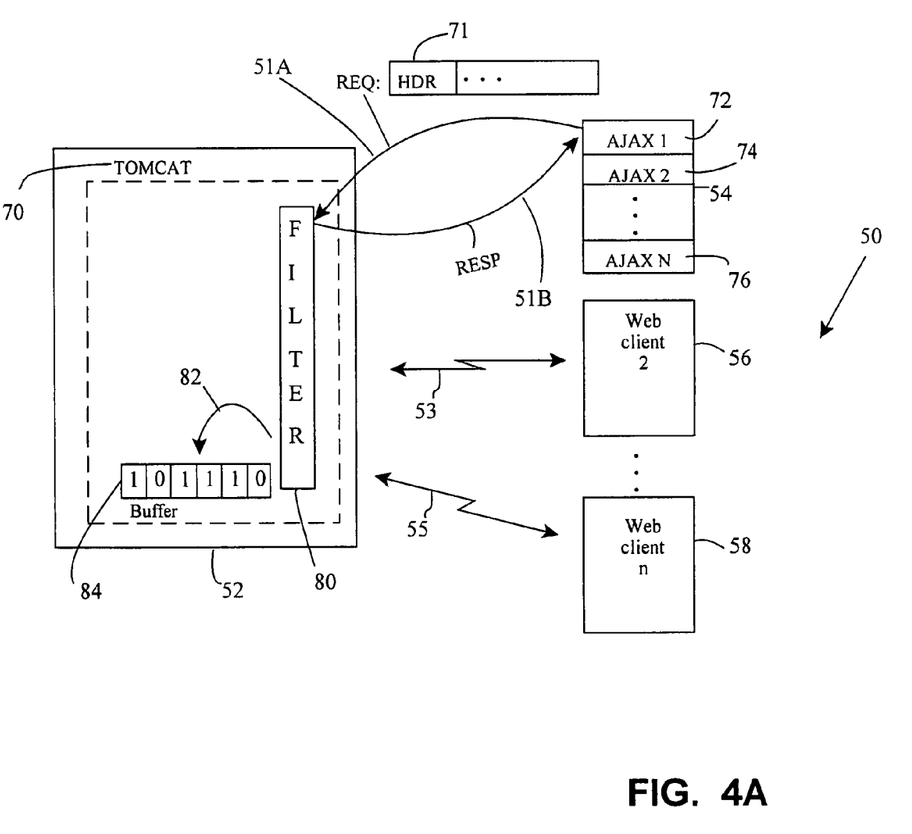
FIG. 4A is a diagrammatic view in accordance with the present invention of an alternate representative computing system environment for stealth entropy collection.
Figure 4B:
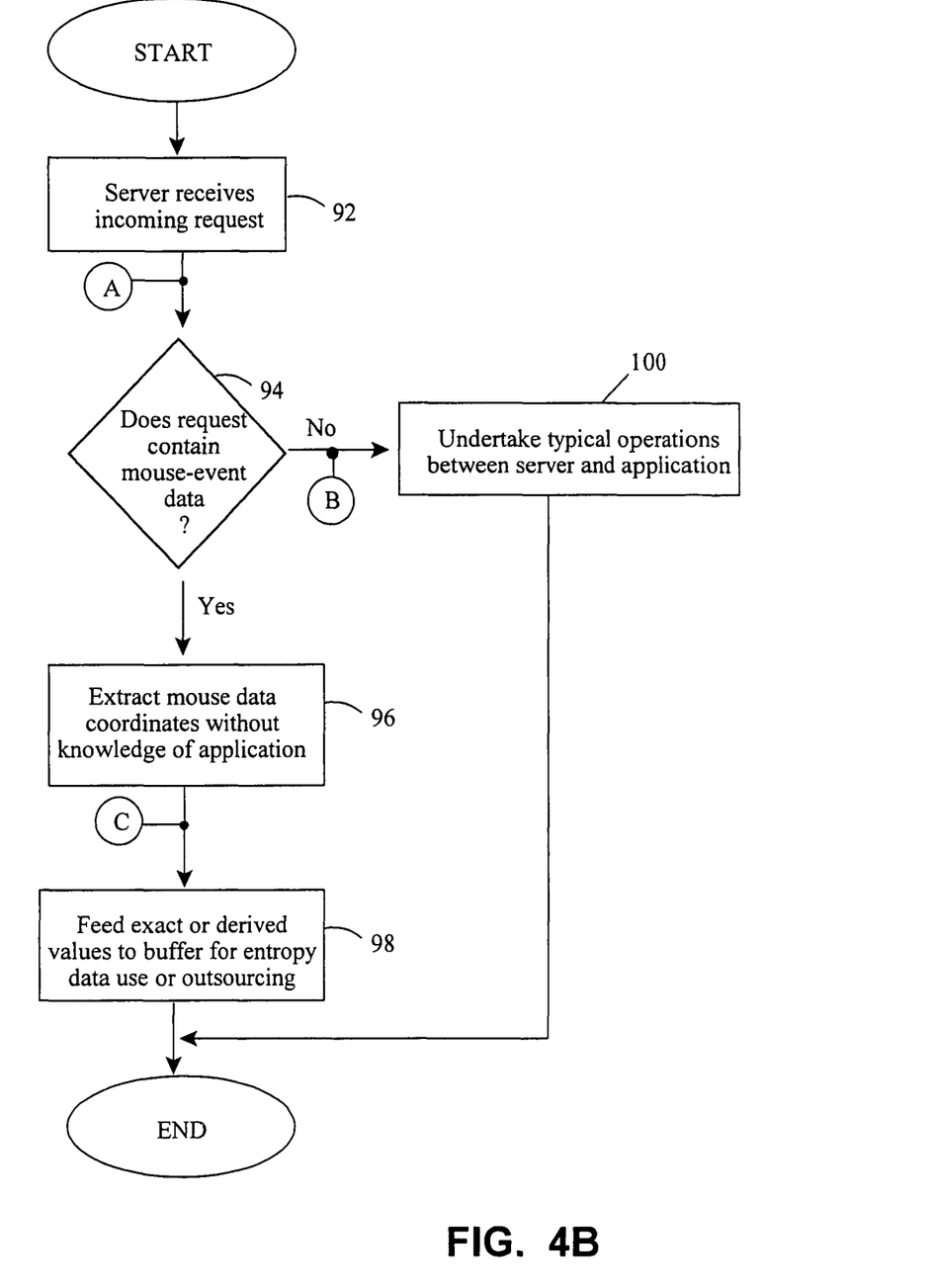
FIG. 4B is a flow chart in accordance with the present invention for stealth entropy collection according to the representation of FIG. 4A.

To further examine particular user-driven values, and more details of the computing environment, reference is taken to FIGS. 4A and 4B. In this embodiment, the receiving or consuming machine 52 is a running Tomcat 70 and is serving interactive web applications of the clients known colloquially as AJAX applications, 72, 74, 76. The server also includes a servlet filter 80 with logic to intercept and examine incoming requests 51A from the web client (in a manner opaque to both the client and the underlying AJAX application).

In that it is common for the AJAX applications to be highly user-interactive, they generate many calls to the server based on mouse-clicks and other events, sometimes seen in the header information 71 of the request. When the filter logic detects that a request 51A contains data about a mouse event, and such data include mouse coordinates (for example), the logic extracts the coordinates 82 and feeds either their raw values or a derived value into an entropy buffer 84 maintained for immediate or later use by the consumer and/or as an outsource to another consumer. The server also returns the requested information to the AJAX application in the form of response 51B, as is typical. In an alternate embodiment, the extracted entropy may also be sent to a pre-buffer, of sorts, to circumvent nefarious spoofing scenarios by third parties.

In this regard, the incorporated (U.S. Pat. No. 8,606,834) solves the problem where an attacker, for example, establishes potentially many connections 51, 53, 55, to a lone server 52 during a period of low or no server traffic, and proceeds to deliberately stuff entropy payloads with known values, then bombard the server, in hopes of discovering patterns in subsequent cryptographic outputs. Namely, the reference teaches how to track reputations of entropy-providers based on the apparent quality of incoming entropy data. In the bombardment scenario just described, the quality of incoming data would be demonstrably poor, and the data would be rejected. In the meantime, the gathering or receiving machine would fall back to using the standard Linux (or other OS) entropy mechanisms.

Turning back to the present invention, the flow organization consists first of the server receiving the incoming request of the web client and/or AJAX application at step 92. If the request contains mouse-event data, at step 94, especially by way of examination of the request by the filter logic, the mouse event data is extracted, at step 96, without knowledge of the underlying AJAX application (or web client as a whole). As before, the extracted or derived values are then buffered for entropy-data use or outsourcing at step 98. If, on the other hand, the request does not contain any mouse-event data, the exchange of information between the server and client occurs as is typical in an http session, for example (step 100).

Figure 5:
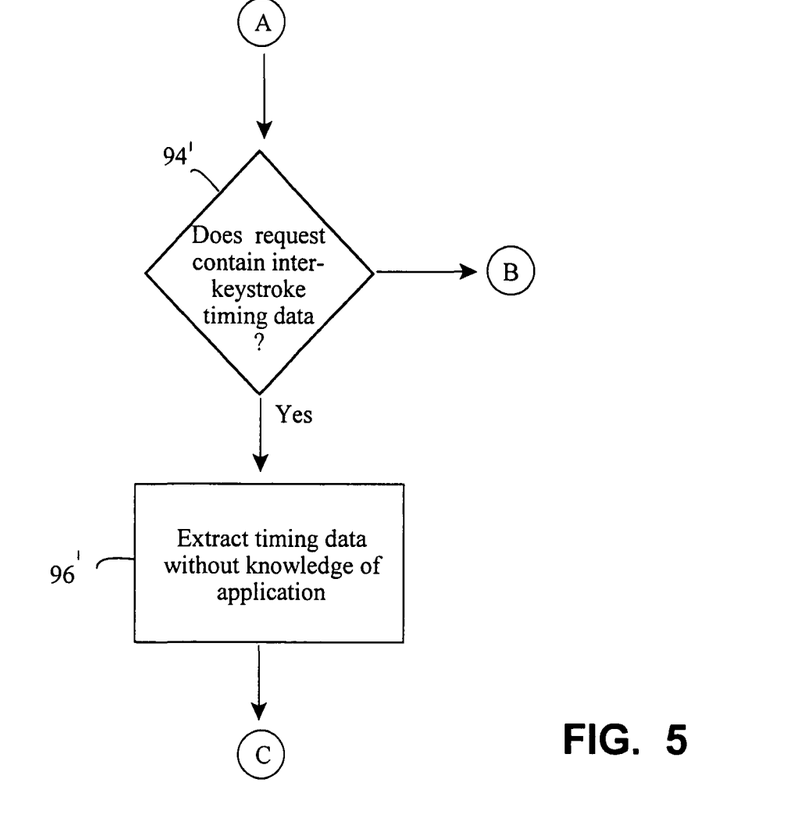
FIGS. 5-7 are flow charts in accordance with the present invention for alternative embodiments of stealth entropy collection according to the flow chart of FIG. 4B.
Figure 6:
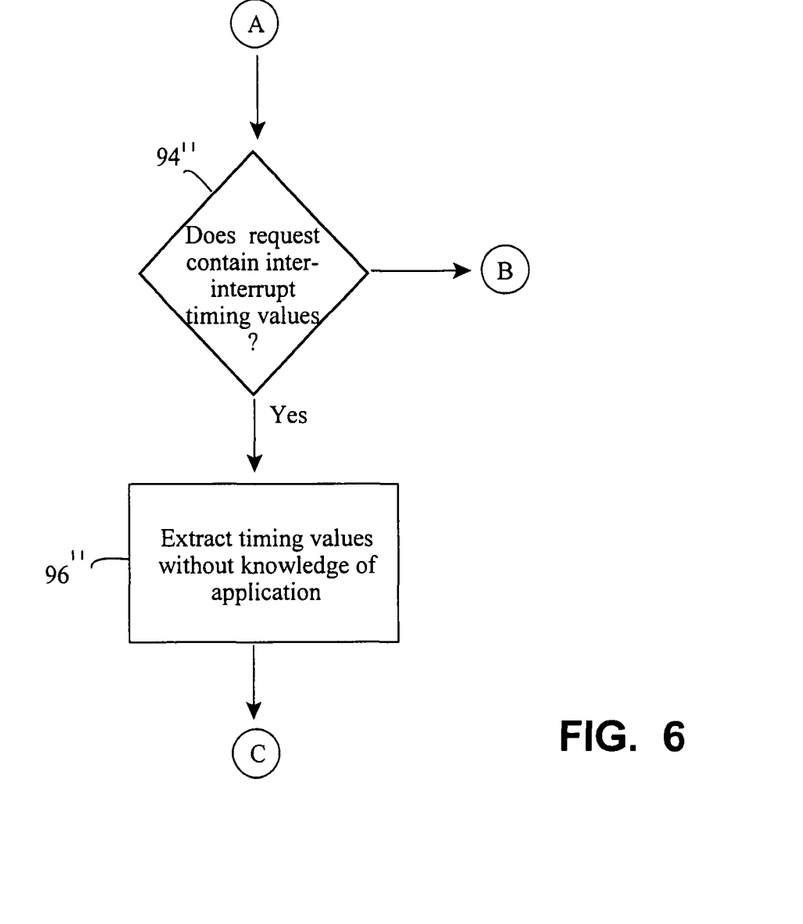
Figure 7:
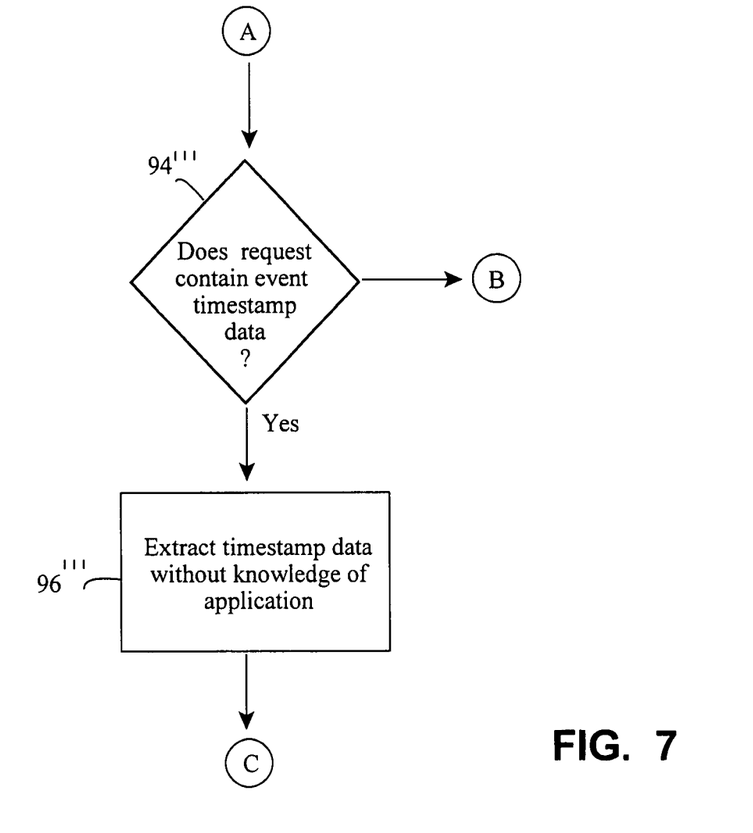

Since mouse-event data is only representative of the myriad of possibilities that could be examined by the entropy-gatherer for unpredictability, FIGS. 5-7 show alternate embodiments. Namely, steps 94', 94", and 94'" replace step 94 in FIG. 4B, individually, as do steps 96', 96", and 96'" replace step 96. They also contemplate requests by the AJAX application of one of inter-keystroke timing data, inter-interrupt timing values or event timestamp data. The extraction then, by the servlet filter, relates to extracting the user-driven value, and buffering same, and doing so without knowledge to the web client or its attendant applications. Of course, other possibilities are now within the knowledge of the skilled artisan and the invention is only limited by the appended claims.

Figure 8A:
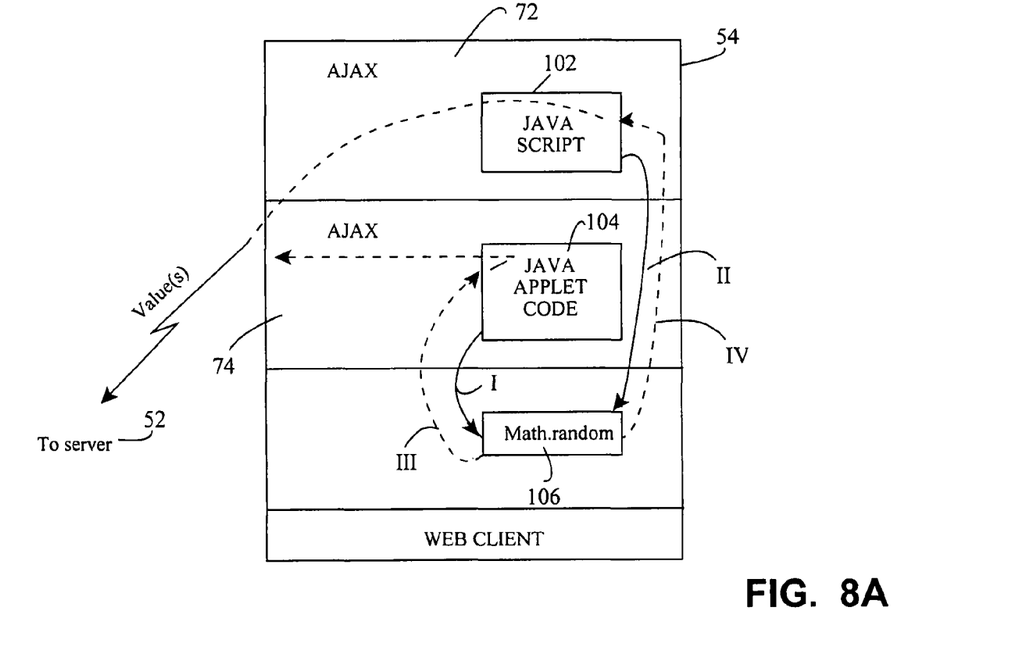
FIG. 8A is a diagrammatic view in accordance with the present invention of an alternate representative computing system environment for stealth entropy collection.
Figure 8B:
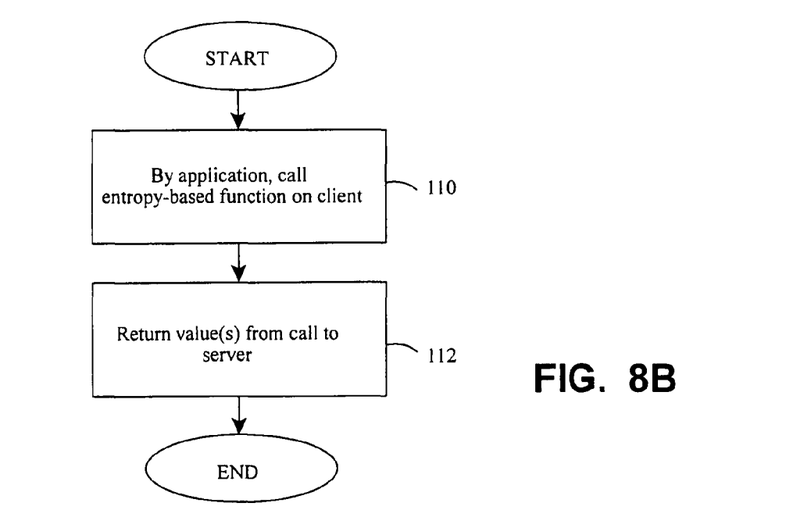
FIG. 8B is a flow chart in accordance with the present invention for stealth entropy collection according to the representation of FIG. 8A.

With reference to FIGS. 8A and 8B, another embodiment contemplates an AJAX application 72, 74 containing JavaScript 102 or Java-applet code 104, for example. During use, upon the JavaScript 102 or Java applet code 104 calling an entropy-based function, such as Math.random( ) 106 on the client device 54 (action arrows I or II corresponding to step 110), entropy synergy will be developed between the application/client and the web server 52. That is, if the value returned from the entropy-based function 106 to the applications (action arrows III or IV) is then returned back to the server 52 (step 112), the server can laden an already entropy-laden value with another layering of entropy. Stated differently, a random number generated from a seed value already stirred with a measure of unpredictability (by the client) and then stirring it again with a measure of unpredictability (by the server), will only enhance the entropy in the system. In this way, the entropy-consuming device benefits from entropy previously captured by the client machine's own PRNG seeding logic. Of course, other entropy-based functions are contemplated and skilled artisans will readily recognize them.

Figure 9:
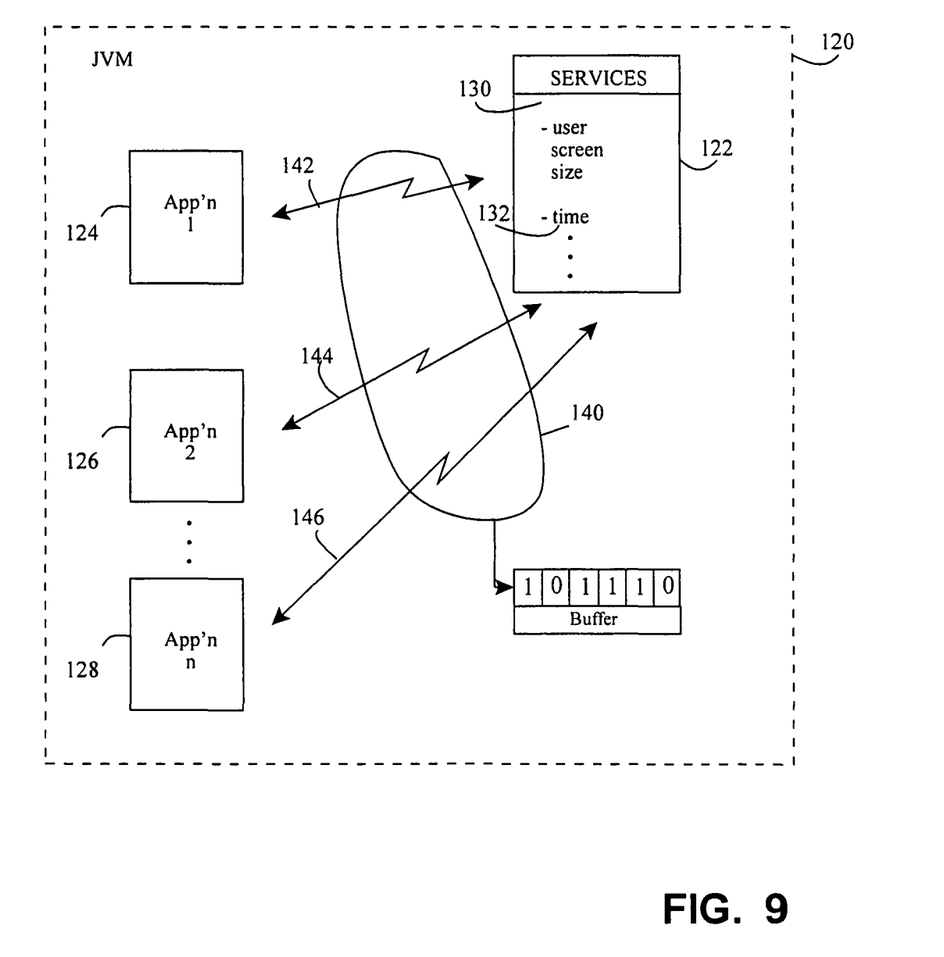
FIG. 9 is a diagrammatic view in accordance with the present invention of an alternate representative computing system environment for stealth entropy collection.

With reference to FIG. 9, another computing environment for stealth entropy collection contemplates a Java virtual machine (JVM) 120. As part of the JVM, integral services 122 and at least one internal application 124, 126, 128 are provided. As is known, the services provide commonality for the applications for items, such as what is a user's screen size, 130, or what is the present time, 132, to name a few. The surreptitious gathering of entropy data then contemplates logic 140 to exploit applications exchanging requests and responses 140, 142, 144 with the integral services relative to unpredictable values (entropy), such as the afore-mentioned inquiries relating to user screen sizes, a present time, etc. A buffering of the entropy, so collected, then occurs with a buffer 150 for immediate or later use or outsourcing, as before.

In still another embodiment, the invention contemplates finding entropy or unpredictable-laden values by way of a computing environment typified by a network interface card (NIC). At a high level, an NIC is a physical device that acts as a gateway through which data frames or packets are transmitted and received by any machine in a network. A NIC is also known by other names, depending upon network type, and all names are collectively referred to as a NIC herein. For instance, a NIC in an Ethernet network is known as an Ethernet Interface Card. Similarly, a NIC in a token ring network is known as a token ring interface card, etc.

Figure 10A:
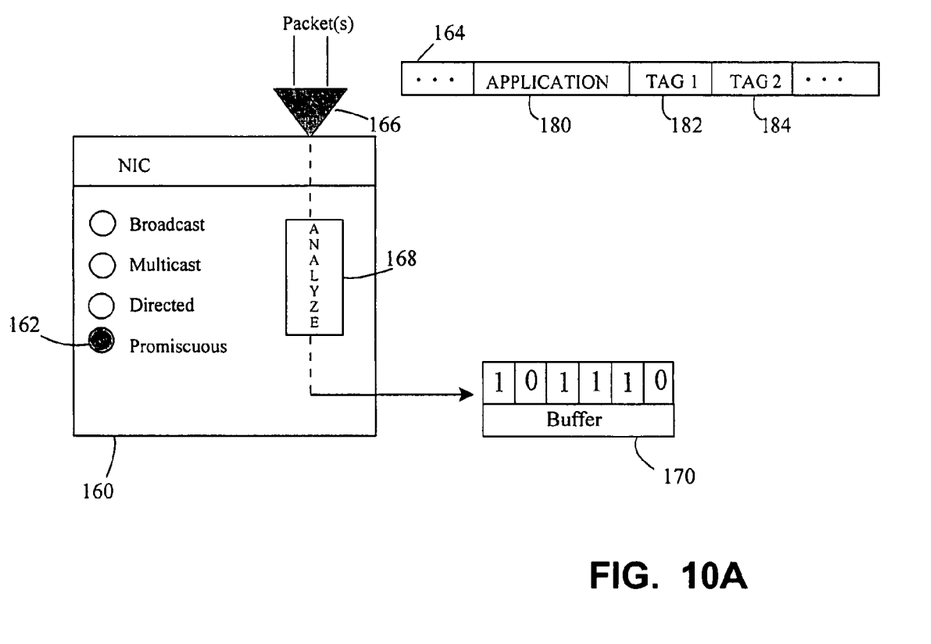
FIG. 10A is a diagrammatic view in accordance with the present invention of an alternate representative computing system environment for stealth entropy collection.
Figure 10B:
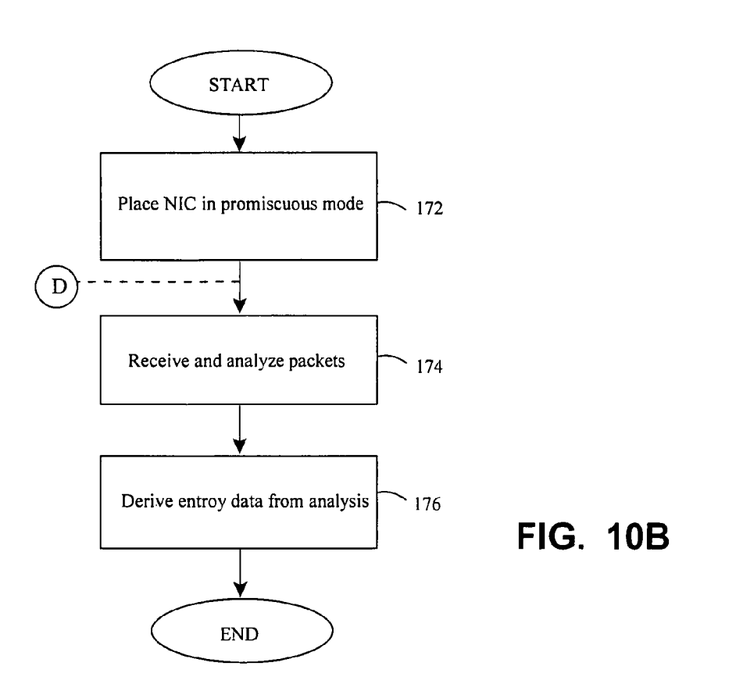
FIG. 10B is a flow chart in accordance with the present invention for stealth entropy collection according to the representation of FIG. 10A.

With reference to FIGS. 10A and 10B, a NIC 160 is provided with various modes of operation (e.g., broadcast, multicast, directed and promiscuous), as is typical. The NIC is placed in a promiscuous mode 162 to receive and analyze any and all packets 164 coming to it 166 to monitor and analyze LAN packets at a low level. In turn, and unbeknownst to the packet itself or a sender of the packet, the packet is analyzed by logic 168 for unpredictable information or entropy data. If so found, the entropy is then buffered 170 and used, as before, for immediate or later use or vended to another consumer. In a basic sense, the flow organization of such an environment follows the listed steps at 172, 174, and 176. In form, a packet length, an amount of time between receipt of packets, or the like, is contemplated for gathering entropy data. In other embodiments, the entropy is stealthily gathered from the APPLICATION type 180 and other tags 182, 184 in network packet payloads. In still other embodiments, entropy is gathered by monitoring and analyzing the collision rate (e.g., ethernet), characterize source and sink IP and MAC addresses, etc. However obtained, it is contemplated that the invention will ultimately measure and analyze the randomness of network service use, which is obviously unpredictable. Also, the foregoing facilitates an easy spotting of attackers attempting to flood packets, such as by way of time-based statistical analysis.

Figure 11A:
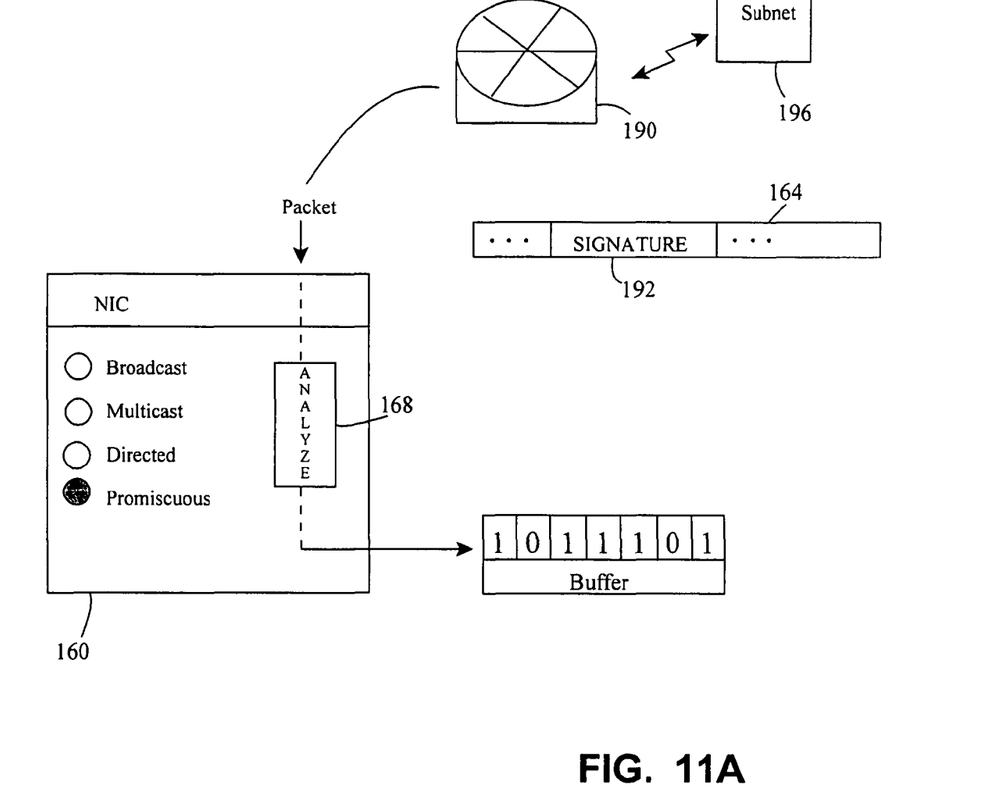
FIG. 11A is a diagrammatic view in accordance with the present invention of an alternate representative computing system environment for stealth entropy collection.
Figure 11B:
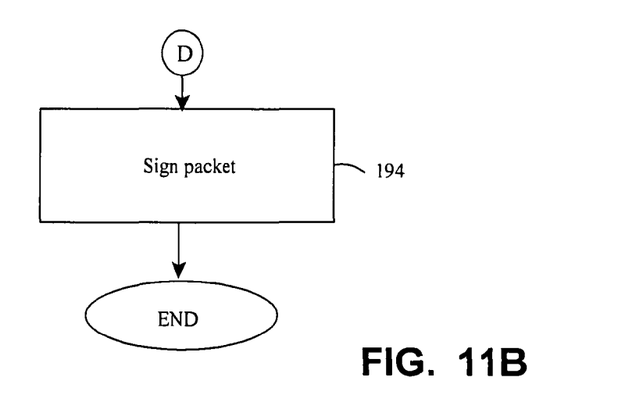
FIG. 11B is a flow chart in accordance with the present invention for an optional embodiment of the flow chart according to FIG. 10B and the representation of FIG. 11A.

With reference to FIGS. 11A and 11B, the invention is further enhanced by enlisting routers and/or switches 190 to participate by distributing signed packets 192 (optional step 194) that contain summary information from other subnets 196 on the LAN and network information as per the paragraph above. And, of course, if the trust model were good enough, then the stealth gathering of entropy would occur at the WAN level and beyond. Intuitively, some point exists where the traffic patterns would defy attack because of the sheer volume (e.g., backbone traffic at peering points). Of course, there must be a sufficient population of source and sink targets so that the traffic patters are broad enough, but that also yields to simple statistical analysis.

Figure 12:
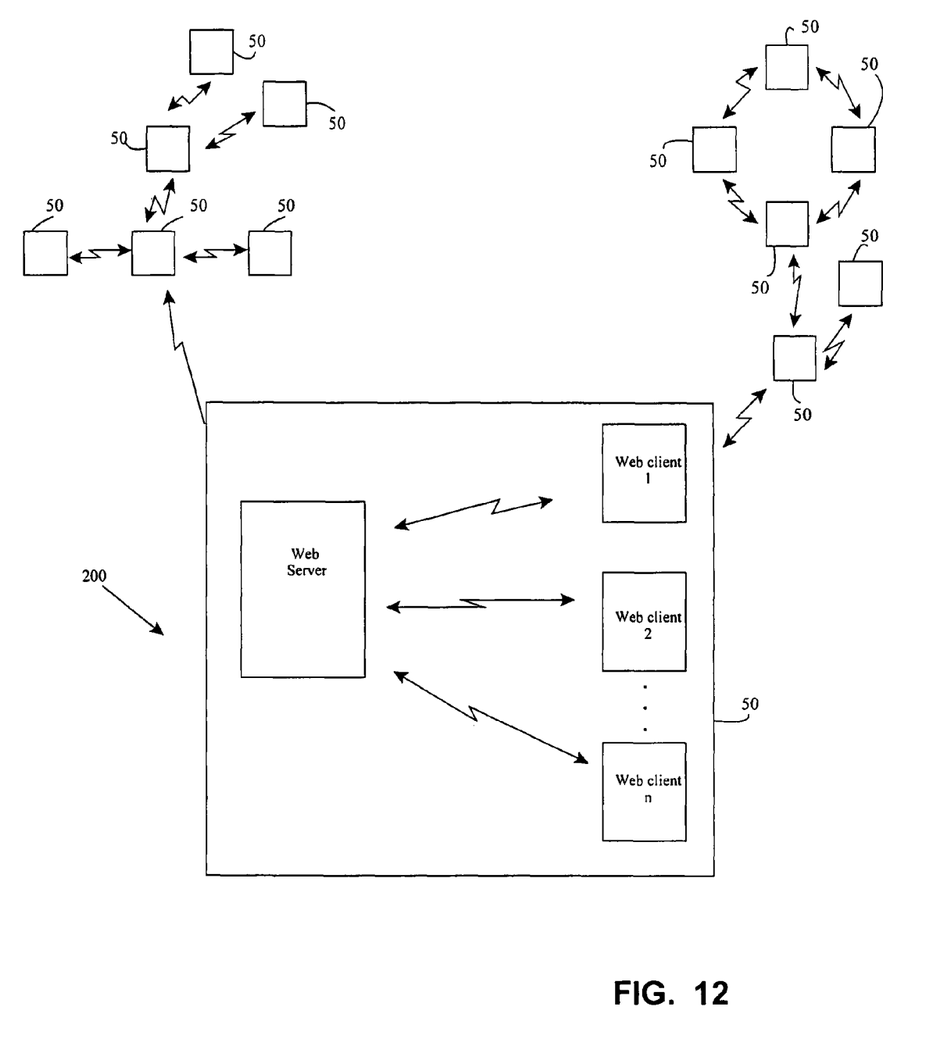
FIG. 12 is a diagrammatic view in accordance with the present invention of a representative larger computing system environment for stealth entropy collection.

With reference to FIG. 12, the stealth-gathering of entropy occurs not only at the local level, but in larger computing system environments 200. Namely, any of the previously mentioned or other contemplated computing environments can be enlarged into greater form. As seen, the computing environment 50 is replicated many times over in various connections and with each iteration of gathering entropy surreptitiously from one or more devices, entropy synergy is developed.

As a result, certain advantages of the invention over the prior art are readily apparent. For example, it is heretofore unknown to stealthily gather entropy from unknowing participants, in existing computing environments arranged for purposes other than entropy collection. It is also unknown before this invention to provide just-in-time or immediate availability of high yield entropy data. Of course, the more computing devices enlisted by a gatherer or consumer of entropy, the more volume that exists for a given application. This invention also enables the transmission of entropy data (or data intended for use in entropy) in the clear, unlike that taught in U.S. Patent Application No. 20060072747. Still other advantages include, but are not limited to, greatly expanding the potential supply of entropy on a networked computing device, reducing the potential for entropy-related denial-of-service attacks in Linux systems, imposing no significant extra processing burden on participating computing devices, and unobtrusively enlisting entropy-providing computing devices (including or not naïve applications, e.g. AJAX) in entropy exchanges.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment having more than one computing device arranged together for other than collection of entropy data, a method of surreptitiously gathering entropy data, comprising:
    placing a network interface card (NIC) of one computing device of the more than one computing devices in a promiscuous mode;
    by the NIC, receiving any current packet coming to the NIC from another computing device of the more than one computing devices;
    by a logic component in the NIC, unbeknownst to the packet or a sender of the packet analyzing the current packets for entropy data regardless of whether the one or another computing devices ever earlier communicated while the one computing device provides an expected response to the another computing device of the more than one computing devices; and
    extracting and buffering said entropy data for entropy data use.

2. The method of claim 1, wherein the analyzing includes one of determining a length of the one or more of the any current packets, determining a time between the one or more of the any packets, and determining a rate of collisions between the one or more of the any packets.

3. The method of claim 1, further including using the extracted entropy data as a seed value for a pseudo random number generator.

4. The method of claim 1, further including outsourcing the extracted entropy data to a data recipient.

5. The method of claim 1, further including buffering the entropy bits for immediate or later use or outsourcing by the one computing device.

6. A common computing device for surreptitiously gathering entropy data, comprising:
    a network interface card (NIC) having one or more modes including a promiscuous mode to enable receipt of any packet that comes to the NIC from a second computing device external to the common computing device;
    a logic component in the NIC to analyze the any packets; and
    an entropy bit buffer connected to the NIC within the common computing device for use within the common computing device or outsourcing to another computing device of entropy bits by the NIC as a seed value, the logic component to 1) examine the any packets and 2) siphon unpredictable characteristics of the any packets as entropy bits to the entropy bit buffer unbeknownst to the any packets or the second computing device, regardless of whether the common computing device or the second computing device have ever earlier communicated with one another, the unpredictable characteristics of the any packets being siphoned as entropy bits to the entropy bit buffer for entropy data use.

7. The common computing device of claim 6, wherein the entropy bit buffer outsources the entropy bits to the another computing device as a seed value for a pseudo random number generator.

8. The common computing device of claim 6, wherein the entropy bit buffer outsources the entropy bits to a data recipient.

* * * * *